(12) United States Patent
Wood et al.

(10) Patent No.: US 11,136,109 B2
(45) Date of Patent: *Oct. 5, 2021

(54) AIRFOIL FOR A ROTARY MACHINE INCLUDING A PROPELLOR ASSEMBLY

(71) Applicant: GENERAL ELECTRIC COMPANY, Schenectady, NY (US)

(72) Inventors: Trevor Howard Wood, Clifton Park, NY (US); Kishore Ramakrishnan, Rexford, NY (US)

(73) Assignee: General Electric Company, Schenectady, NY (US)

( * ) Notice: Subject to any disclaimer, the term of this patent is extended or adjusted under 35 U.S.C. 154(b) by 114 days.

This patent is subject to a terminal disclaimer.

(21) Appl. No.: 16/550,868

(22) Filed: Aug. 26, 2019

(65) Prior Publication Data

US 2020/0010174 A1 Jan. 9, 2020

Related U.S. Application Data

(63) Continuation of application No. 15/378,614, filed on Dec. 14, 2016, now Pat. No. 10,414,486, which is a (Continued)

(51) Int. Cl.
*F01D 5/14* (2006.01)
*B64C 11/18* (2006.01)
(Continued)

(52) U.S. Cl.
CPC ............. *B64C 11/18* (2013.01); *F01D 5/141* (2013.01); *F04D 29/324* (2013.01);
(Continued)

(58) Field of Classification Search
CPC ....... B64C 11/18; F01D 5/141; F04D 29/324; F04D 29/325; F05D 2260/96
See application file for complete search history.

(56) References Cited

U.S. PATENT DOCUMENTS 1,597,175 A 8/1926 Boening
2,269,287 A 1/1942 Roberts
(Continued)

FOREIGN PATENT DOCUMENTS

EP 1953344 B1 4/2012
EP 2149701 A3 9/2013
(Continued)

OTHER PUBLICATIONS

Leverton, Joseph, "NASA Contractor Report: Helicopter Noise—Blade Slap", Mar. 1972, National Aeronautics and Space Administration, pp. 13-14, 50, 52.
(Continued)

*Primary Examiner* — Ninh H. Nguyen
(74) *Attorney, Agent, or Firm* — Fitch, Even, Tabin & Flannery, LLP

(57) ABSTRACT

In some embodiments, an airfoil comprises a proximal end; a distal end opposite said proximal end; a distal portion extending adjacent said distal end; an edge extending between said proximal end and said distal end; and a surface extending between said proximal end and said distal end, said edge and said surface defining a sweep and a cahedral through said distal portion, wherein the distal portion extends over an acoustically active portion of the airfoil.

20 Claims, 8 Drawing Sheets

Related U.S. Application Data continuation-in-part of application No. 15/092,255, filed on Apr. 6, 2016, now abandoned.

(60) Provisional application No. 62/261,165, filed on Nov. 30, 2015.

(51) Int. Cl.
*F04D 29/32* (2006.01)
*B64D 27/00* (2006.01)

(52) U.S. Cl.
CPC ...... *F04D 29/325* (2013.01); *B64D 2027/005* (2013.01); *F05D 2260/96* (2013.01); *Y02T 50/60* (2013.01)

(56) References Cited

U.S. PATENT DOCUMENTS

| | | | |
|---|---|---|---|
| 3,294,175 | A | 12/1966 | Bodner |
| 4,012,172 | A | 3/1977 | Schwarr et al. |
| 4,324,530 | A | 4/1982 | Fradenburgh et al. |
| 4,334,828 | A | 6/1982 | Moffitt |
| 4,370,097 | A | 1/1983 | Hanson et al. |
| 4,664,593 | A | 5/1987 | Hayashi et al. |
| 4,883,240 | A | 11/1989 | Adamson et al. |
| 4,936,746 | A | 6/1990 | Mayo et al. |
| 5,190,441 | A | 3/1993 | Murphy |
| 6,301,868 | B1 | 10/2001 | Siplinger |
| 6,976,829 | B2 | 12/2005 | Kovalsky et al. |
| 7,407,366 | B2 | 8/2008 | Hedlund et al. |
| 8,066,219 | B2 | 11/2011 | Patt et al. |
| 8,221,081 | B2 | 7/2012 | Lebrun |
| 8,425,191 | B2 | 4/2013 | Ali |
| 8,517,668 | B1 | 8/2013 | Morin et al. |
| 8,622,334 | B2 | 1/2014 | Drela et al. |
| 8,936,219 | B2 | 1/2015 | Roman et al. |
| 9,061,758 | B2 | 6/2015 | Schimke et al. |
| 9,605,542 | B2 * | 3/2017 | Gallagher .............. F04D 29/325 |
| 9,677,404 | B2 * | 6/2017 | Merville .................. F01D 5/34 |
| 9,765,795 | B2 * | 9/2017 | Duong .................. F04D 29/324 |
| 10,301,941 | B2 * | 5/2019 | Cellier .................. F04D 29/324 |
| 2003/0118446 | A1 | 6/2003 | Han et al. |
| 2010/0028157 | A1 | 2/2010 | Kinzie et al. |
| 2010/0054913 | A1 | 3/2010 | Morel |
| 2010/0124500 | A1 | 5/2010 | Lebrun |
| 2010/0135806 | A1 | 6/2010 | Benito |
| 2010/0150729 | A1 | 6/2010 | Kirchner |
| 2011/0277447 | A1 | 11/2011 | Sturmer |
| 2012/0034095 | A1 | 2/2012 | Towkan |
| 2012/0315141 | A1 | 12/2012 | Udall |
| 2013/0115083 | A1 | 5/2013 | Vuillemin |
| 2013/0156583 | A1 | 6/2013 | Wood |
| 2015/0315915 | A1 | 11/2015 | Vlastuin et al. |
| 2015/0344127 | A1 | 12/2015 | Wood et al. |

FOREIGN PATENT DOCUMENTS

| | | |
|---|---|---|
| FR | 2935348 A1 | 3/2010 |
| FR | 2935349 A1 | 3/2010 |
| FR | 2964426 A1 | 3/2012 |
| FR | 2974060 A1 | 10/2012 |
| GB | 946794 | 1/1964 |
| JP | S62149598 A | 7/1987 |
| JP | S6449598 A | 2/1989 |
| KR | 101451219 B1 | 10/2014 |
| WO | 03008267 A1 | 1/2003 |
| WO | 2011081577 A1 | 7/2011 |
| WO | 2012140385 A1 | 10/2012 |
| WO | 2014066515 A1 | 5/2014 |

OTHER PUBLICATIONS

Piccione, E., et al. "Optimal design and acoustic assessment of swept-tip helicopter rotor blades." ISMA2012 International Conference on Noise and Vibration Engineering, Sep. 17-19, 2012, Leuven, Belgium, pp. 587-602.

Bhaskar, R. et al., "Study of Tip Flows in High Hub-to-Tip Ratio Axial Compressors at Low Speed With Varying Tip Gaps, Inflow Conditions and Tip Shapes," ASME Turbo Expo 2010: Power for Land, Sea, and Air. American Society of Mechanical Engineers, Jun. 14-18, 2010, Glasgow, UK, pp. 1-14.

Goller, M. et al., "Enhancement of Highly-Loaded Axial Compressor Stage Performance Using Rotor Blade Tip Tailoring: Part I—Numerical Design Studies," 6th Conference on Turbomachinery: Fluid Dynamics and Thermodynamics, ETC 2005, Lille, France, Mar. 7-11, 2005, abstract only, 1 page.

Yung H. Yu, "Rotor blade-vortex interaction noise," Progress in Aerospace Sciences, vol. 36, 2000, pp. 97-115.

* cited by examiner

AIRFOIL FOR A ROTARY MACHINE INCLUDING A PROPELLOR ASSEMBLY

CROSS REFERENCE TO RELATED APPLICATIONS

This application is a continuation of U.S. patent application Ser. No. 15/378,614, filed Dec. 14, 2016, which is a continuation in part of U.S. patent application Ser. No. 15/092,255, filed Apr. 6, 2016, which claims priority to U.S. Provisional Application No. 62/261,165 filed Nov. 30, 2015, all of which are hereby incorporated by reference in their entirety.

BACKGROUND

The field of the disclosure relates generally to airfoils and, more particularly, to airfoils for rotary machines that include a propeller assembly.

At least some known rotary machines are gas turbine engines used for propelling an aircraft in flight. Some known gas turbine engines include a combustor, a compressor coupled upstream from the combustor, a turbine, a rotor assembly rotatably coupled between the compressor and the turbine. At least some known aircraft engines include at least one airfoil that is moved through fluid to produce an aerodynamic force. For example, some known rotary machines include a propeller assembly drivingly coupled to the rotor assembly. The rotor assembly rotates to drive the propeller assembly and, thereby, move air to propel the aircraft. Rotation of the propeller assembly also generates tip flow structures, which cause noise and aerodynamic inefficiencies.

To increase an operating efficiency, some known rotary machines include winglets on blades of the propeller assemblies to inhibit air flowing over the tip of the blade and, thereby reduce the generation of flow structures. The winglets project from each blade at or very near the tip of the blade and form a change in direction along a surface of the blade. However, the change in direction sometimes generates flow patterns that increase a noise level of the rotary machine during operation.

Some known aircraft engines include two or more propeller assemblies that interact to move air and, thereby, propel an aircraft. The interaction of the propeller assemblies generates flow structures, which cause operating inefficiencies. Accordingly, some aircraft engines include fences attached to the blades of the forward propeller assembly to reduce the operating inefficiencies caused by the interaction of the propeller assemblies. However, the two or more propeller assemblies are not configured for use in rotary machines having a single propeller assembly, such as unducted single fan propulsion systems and turboprop engines.

BRIEF DESCRIPTION

In some embodiments, an airfoil comprises a proximal end; a distal end opposite said proximal end; a distal portion extending adjacent said distal end; an edge extending between said proximal end and said distal end; and a surface extending between said proximal end and said distal end, said edge and said surface defining a sweep and a cahedral through said distal portion, wherein the distal portion extends over an acoustically active portion of the airfoil. In some embodiments, a rotary machine may include at least one rotatable member; a casing extending at least partly circumferentially around said at least one rotatable element; and a propeller assembly adjacent said casing and drivingly coupled to said at least one rotatable member, said propeller assembly comprising: a hub; at least one blade extending radially from said hub, said at least one blade comprising: a proximal end adjacent said hub; a distal end opposite said proximal end; an intermediate portion extending between said proximal end and said distal end; a distal portion extending between said intermediate portion and said distal end; an edge extending between said proximal end and said distal end; and a surface extending between said proximal end and said distal end, said edge and said surface defining a sweep and a cahedral through said distal portion and at least a portion of said intermediate portion, wherein the distal portion extends over an acoustically active portion of the airfoil.

DRAWINGS

These and other features, aspects, and advantages of the present disclosure will become better understood when the following detailed description is read with reference to the accompanying drawings in which like characters represent like parts throughout the drawings, wherein.

Figure 1:
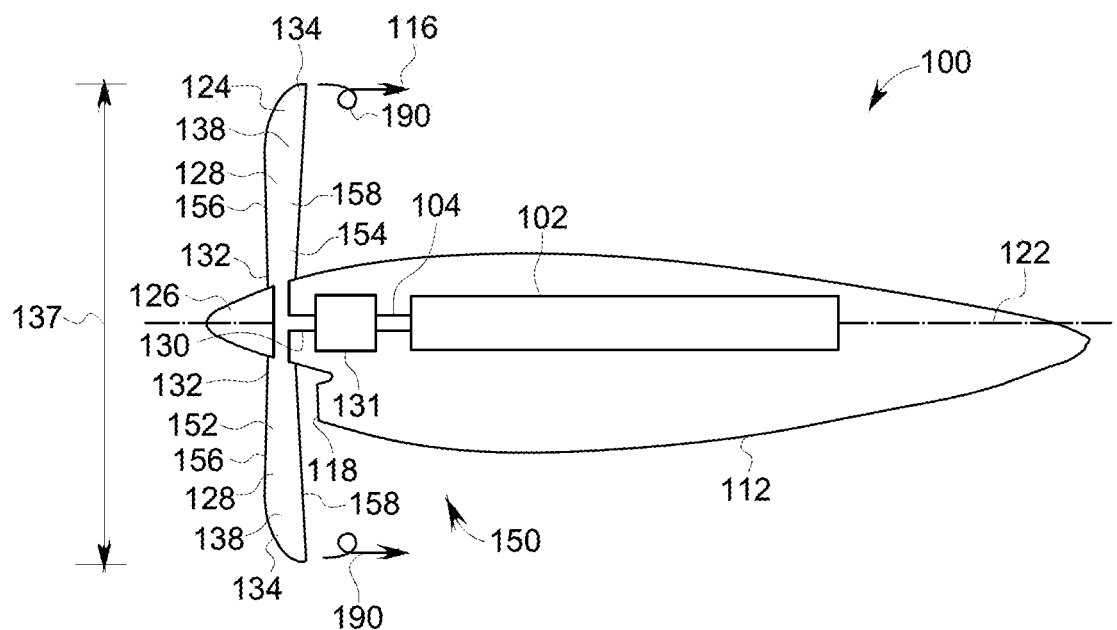
FIG. 1 is a sectional schematic of an exemplary rotary machine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "axial" and "axially" refer to directions and orientations extending substantially parallel to a longitudinal axis of a rotary machine. The terms "radial" and "radially" refer to directions and orientations extending substantially perpendicular to the longitudinal axis of the rotary machine. In addition, as used herein, the terms "circumferential" and "circumferentially" refer to directions and orientations extending arcuately about the longitudinal axis of the rotary machine. Moreover, "upstream" refers to a forward end of the rotary machine, and "downstream" refers to an aft end of the rotary machine.

As used herein, the term "cahedral" refers to an angle of a portion of a blade in relation to the radial axis of the blade. The term "cahedral" is a generic term used to refer to both dihedral and anhedral. As used herein, the term "dihedral" refers to an angle of a portion of a blade in relation to the radial axis where the blade portion extends on a low pressure side of the blade. The term "anhedral" refers to an angle of a portion of a blade in relation to the radial axis where the blade portion extends on a high pressure side of the blade. In addition, as used herein, the term "sweep" refers to an angle of a curve of a blade in relation to the radial axis.

The rotary machine systems described herein decrease sound generated by the rotary machine systems by including an airfoil having a cahedral and a sweep. The cahedral and the sweep reduce noise generated by the rotary machine systems as the airfoil moves through air. In some embodiments, the cahedral and the sweep extend throughout a distal portion of each airfoil such that the rotary machine systems generate less noise during operation than known rotary machine systems. Moreover, some embodiments described herein provide for increased efficiency of the rotary machine systems.

Although generally described herein with respect to an aircraft gas turbine engine, the methods and systems described are applicable to any systems that include an airfoil, for example, without limitation, turbojets, turbofans, propellers, unducted fans driven by reciprocating engines or electric motors, wind turbines, and other systems that require an airfoil. In some embodiments, the systems described herein include, without limitation, any of the following airfoils: a single rotation propeller, an outlet guide vane, a fan blade, a rotor blade, a stator vane, a ducted fan blade, an unducted fan blade, a strut, a turbine vane frame, a wind turbine blade, a propeller, an impeller, a diffuser vane, a return channel vane, flap leading edges, wing leading edges, landing gear fairings, a marine propeller, and a pylon. As used herein, a single rotation propeller is defined as a propeller rotating in a single direction (e.g., not a component of a contrarotating system) and can be disposed in front of or behind one or more stationary airfoils (e.g., a wing, pylon, vane such as an outlet guide vane or the like).

FIG. 1 is a sectional schematic view of an exemplary rotary machine. In the exemplary embodiment, the rotary machine is a gas turbine engine, indicated generally by the reference number 100. Alternatively, the rotary machine is any other turbine engine and/or rotary machine, including, without limitation, a steam turbine engine, a centrifugal compressor, and a turbocharger. In the exemplary embodiment, gas turbine engine 100 includes a drive 102 and a drive shaft 104 extending from drive 102. During operation of gas turbine engine 100, drive 102 rotates drive shaft 104 to cause movement of a load connected to drive shaft 104. In some embodiments, drive 102 includes, in serial flow relationship, a compressor (not shown), a combustor (not shown) downstream from compressor, and a turbine (not shown) downstream from combustor. In alternative embodiments, drive 102 includes any components that enable gas turbine engine 100 to operate as described herein. A casing 112 at least partly surrounds drive 102 and at least partly defines an airway for air 116 to flow through gas turbine engine 100. Casing 112 includes an inlet 118 and an outlet (not shown) downstream from inlet 118. In the exemplary embodiment, gas turbine engine 100 is generally disposed about an engine centerline 122.

In the exemplary embodiment, gas turbine engine 100 further includes a propeller assembly 124. Propeller assembly 124 includes a hub 126 and a plurality of blades (airfoils) 128 extending radially from hub 126. Hub 126 is coupled to a propeller shaft 130, which is drivingly coupled to drive shaft 104 by a drive gear 131 such that rotation of drive shaft 104 induces rotation of propeller assembly 124. Each of blades 128 have a proximal end 132 adjacent and coupled to hub 126 and a distal end 134, i.e., tip, opposite proximal end 132. Propeller assembly 124 has a propeller diameter 137 that is measured substantially perpendicular to engine centerline 122 between distal ends 134 of blades 128. As will be described in more detail below, each blade 128 includes a cahedral 136 defined through a distal portion 138 of each blade 128. Each blade 128 further includes a sweep 140 (shown in FIG. 3) defined through at least distal portion 138. As a result, blade 128 reduces noise generated during operation of gas turbine engine 100. For example, in some embodiments, flow structures 190 in air 116 along blades 128 are dispersed into a flow pattern that reduces noise generated by gas turbine engine 100.

A high-pressure surface 154 and an opposed low-pressure surface 152 extend between proximal end 132 and distal end 134. A leading edge 156 and a trailing edge 158 also extend between proximal end 132 and distal end 134. A thickness of blade 128 is defined between high-pressure surface 154 and low-pressure surface 152. In alternative embodiments, blade 128 has any surfaces and edges that enable propeller assembly 124 to operate as described herein.

During operation, propeller assembly 124 rotates such that air 116 flows in a generally axial direction of propeller assembly 124 during operation of gas turbine engine 100. However, a portion of air 116 flowing along blade 128 forms flow structures 190. The shape and configuration of blade 128 affects flow structures 190 generated in air 116 flowing along blade 128. In the exemplary embodiment, blade 128 has cahedral 136 and sweep 140 configured to reduce noise generated by blade 128. In alternative embodiments, blade 128 has any configuration that enables blade 128 to operate as described herein.

Figure 2A:
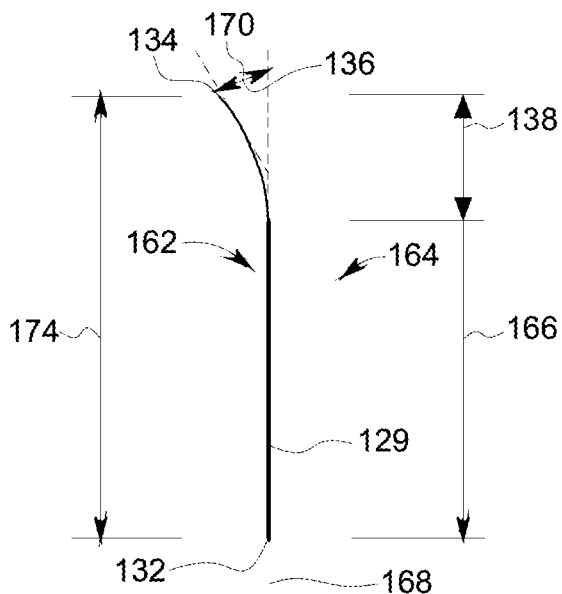
FIG. 2A is a stacking line of an exemplary blade of the rotary machine shown in FIG. 1.
Figure 2B:
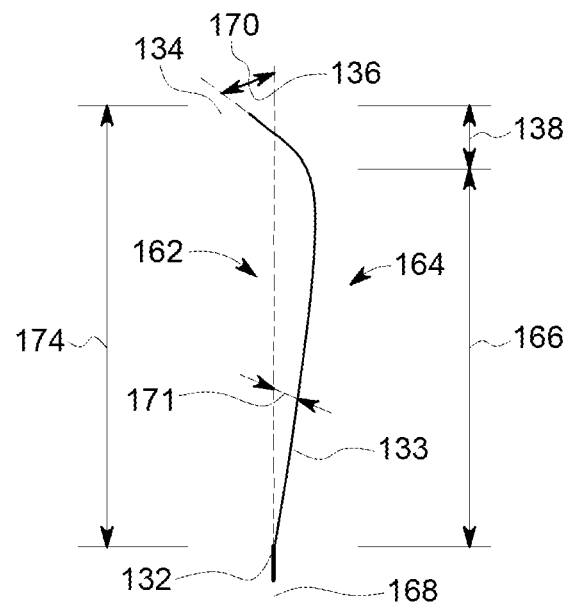
FIG. 2B is a stacking line of an exemplary blade of the rotary machine shown in FIG. 1.

FIG. 2A is a stacking line 129 of blade 128. FIG. 2B is an alternative stacking line 131 of blade 128. Stacking line 129 and stacking line 131 extend in the radial direction along the span of blade 128. Blade 128 has distal portion 138 which includes portions of leading edge 156, trailing edge 158, high-pressure surface 154 (shown in FIG. 4), and low-pressure surface 152 (shown in FIG. 4). The distal portion 138 may be any portion of the blade 128, for example, extending from the proximal end 132 to distal end 134 of the blade 128, or in some embodiments, extending from an intermediate portion 166 of blade 128 to distal end 134. In some embodiments, the distal portion 128 may extend over an acoustically active portion of the airfoil (indicated at 138). The acoustically active portion of the blade 128 may be determined, for example, via a relationship between a source strength distributed radially along the airfoil and a radiation efficiency along the airfoil, for example, such as described below with respect to FIGS. 12 and 13.

Distal portion 138 is configured, at least in part, to reduce noise generated in air 116 flowing along blade 128. For example, in the exemplary embodiment, distal portion 138 defines cahedral 136 of blade 128. In the exemplary embodiment, high-pressure surface 154 (shown in FIG. 4) and low-pressure surface 152 (shown in FIG. 4) slope away from a radial axis 168 to define cahedral 136. In addition, leading edge 156 (shown in FIG. 1) and trailing edge 158 (shown in FIG. 1) curve to at least partially define cahedral 136. In alternative embodiments, cahedral 136 is defined by any surfaces and edges of blade 128 that enable propeller assembly 124 to operate as described herein.

In the exemplary embodiment, high-pressure surface 154 (shown in FIG. 4) and low-pressure surface 152 (shown in FIG. 4) extend on low-pressure side 162 of blade 128 such that cahedral 136 is a dihedral 170. In alternative embodiments, any surfaces of blade 128 extend on any sides of blade 128 that enable blade 128 to operate as described herein. For example, in some embodiments, at least one of high-pressure surface 154 and low-pressure surface 152 (shown in FIG. 4) slopes away from radial axis 168 and extends on high-pressure side 164 to form an anhedral 171. In further embodiments, any portions of blade 128 have any cahedral that enable blade 128 to operate as described herein. In the exemplary embodiment, a cahedral axis 172 extends through distal portion 138 and defines cahedral 136 in relation to radial axis 168. In some embodiments, cahedral 136 is in a range extending from about 1° to about 180°. In alternative embodiments, cahedral 136 is any measurement that enables the blade 128 to operate as described herein. For example, in some embodiments, cahedral 136 is in a range extending from about −1° to about −180°.

Figure 3:
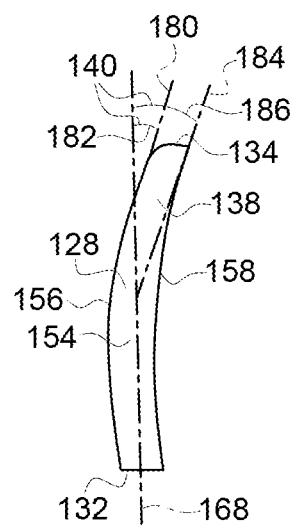
FIG. 3 is a side view of an exemplary blade of the rotary machine shown in FIG. 1.

In some embodiments, blade 128 may have a varying cahedral 136 and/or sweep 140 throughout at least a portion of the blade 128 (e.g., throughout the distal portion 138 of the blade 128, the entire length of blade 128, or the like). For example, in some embodiments, blade 128 has a dihedral 170 through at least a portion of distal portion 138 and anhedral 171 adjacent hub 126 to balance the loading on blade 128. Accordingly, at least one of high-pressure surface 154 (shown in FIG. 4) and low-pressure surface 152 (shown in FIG. 4) crosses radial axis 168 to form opposed dihedral 170 and anhedral 171. In alternative embodiments, blade 128 has any constant or varying cahedral 136 that enables blade 128 to operate as described herein. In further embodiments, the twist and/or camber of blade 128 are configured to balance the loading of blade 128. In particular, the twist and/or camber are designed to compensate for the aerodynamic loading profile changes introduced by the changes to cahedral 136 and sweep 140. In FIG. 3, blade 128 has an aft sweep 140. In alternative embodiments, blade 128 has any sweep 140 that enables blade 128 to operate as described. For example, in some embodiments, blade 128 has an at least partially forward sweep 140. When a variation in the cahedral 136 and/or sweep 140 is present, in some embodiments, a rate of radial variation of sweep and cahedral may be continuous with no jumps or disconnects (e.g., a radial profile of sweep and cahedral angles are at least C1 continuous).

The camber is adjusted in span and chord directions of blade 128 and the twist is adjusted along the span of blade 128. As a result, blade 128 is configured, for example, to reduce adverse effects of a high flow acceleration around leading edge 156 (shown in FIG. 1). In alternative embodiments, blade 128 has any camber and twist that enable propeller assembly 124 to operate as described herein.

In some embodiments, cahedral 136 and sweep 140 through distal portion 138 extends for a portion of the span of blade 128. Substantially the remaining span of blade 128 is configured to balance cahedral 136 and sweep 140. In particular, in some embodiments, the remaining span is shifted relative to radial axis 168, i.e., restacked. For example, in some embodiments, distal portion 138 having cahedral 136 and sweep 140 extends approximately 30% of the span of blade 128. The remaining portion, covering 70% of blade 128, is restacked to offset the mechanical loading stresses associated with cahedral 136 and sweep 140 shifting blade 128 out of balance relative to a baseline blade design. In alternative embodiments, blade 128 has any restacking that enable propeller assembly 124 to operate as described herein. In some embodiments, the camber of blade 128 is adjusted through a portion of the span, i.e., blade 128 is recambered. In further embodiments, the twist of blade is adjusted through a portion of the span, i.e., blade 128 is retwisted.

Also, in the exemplary embodiment, high-pressure surface 154 and low-pressure surface 152 are angled throughout distal portion 138. In alternative embodiments, high-pressure surface 154 and low-pressure surface 152 are angled through any portions of blade 128 that enable blade 128 to operate as described herein. In the exemplary embodiment, high-pressure surface 154 and low-pressure surface 152 are substantially parallel throughout distal portion 138 such that the thickness of blade 128 is substantially constant throughout distal portion 138. The slope of high-pressure surface 154 in relation to radial axis 168 increases from a lesser slope at intermediate portion 166 to a greater slope at distal end 134. Likewise, the slope of low-pressure surface 152 in relation to radial axis 168 increases from a lesser slope at intermediate portion 166 to a greater slope at distal end 134. In alternative embodiments, high-pressure surface 154 and low-pressure surface 152 have any slopes that enable blade 128 to operate as described herein. For example, in some embodiments, at least one of high-pressure surface 154 and low-pressure surface 152 has a varying slope throughout distal portion 138. In further embodiments, at least one of high-pressure surface 154 and low-pressure surface 152 has a portion that is substantially parallel to radial axis 168.

In the exemplary embodiment, blade 128 has a length 174 defined between distal end 134 and proximal end 132 of blade 128 along radial axis 168. Length 174 is any measurement that enables blade 128 to operate as described herein. In the exemplary embodiment, distal portion 138 extends a percentage of length 174 of blade 128 that facilitates the reduction of flow structures 190 generated in air 116 flowing along blade 128. In some embodiments, distal portion 138 extends a percentage of length 174 greater than approximately 1%. In alternative embodiments, distal portion 138 extends any percentage of length 174 that enables blade 128 to operate as described herein.

FIG. 3 is a side view of propeller blade 128. High-pressure surface 154, low-pressure surface 152, leading edge 156, and trailing edge 158 define sweep 140 of blade 128. In particular, leading edge 156 defines a leading edge sweep and trailing edge 158 defines a trailing edge sweep. In the exemplary embodiment, blade 128 has a sweep 140 that is greater than the sweep of at least some known blades. Accordingly, sweep 140 facilitates blade 128 reducing sound and increasing aerodynamic efficiency during operation of gas turbine engine 100 in comparison to known systems. In the exemplary embodiment, sweep 140 is an aft sweep. In alternative embodiments, blade 128 has any sweep 140 that enables propeller assembly 124 to operate as described herein. For example, in some embodiments, sweep 140 is a forward sweep. In the exemplary embodiment, sweep 140 varies along leading edge 156 and trailing edge 158. In alternative embodiments, leading edge 156 and trailing edge 158 define any varying and constant sweeps 140 that enable blade 128 to operate as described herein. In the exemplary embodiment, leading edge 156 and trailing edge 158 define sweeps 140 that increase throughout distal portion 138. A leading edge sweep axis 180 is tangential to leading edge 156 at distal end 134 and makes a leading edge sweep angle 182 along the flow direction with radial axis 168. In the exemplary embodiment, a trailing edge sweep axis 184 is tangential to trailing edge 158 and makes a trailing edge sweep angle 186 along the flow direction with radial axis 168.

In the exemplary embodiment, cahedral 136 and sweep 140 of blade 128 work in conjunction to increase operating efficiency and reduce noise generated by propeller assembly 124. In particular, cahedral 136 and sweep 140 affect loading on blade 128 and the camber and twist of blade 128 is redesigned to counteract changes to loading distribution to maximize noise benefits of sweep 140 and cahedral 136. Otherwise, improperly designed blades including cahedral and sweep can increase noise generated during operation of propeller assemblies. However, as described herein, blades 128 including cahedral 136 and sweep 140 reduce noise generated during operation of propeller assembly 124. In some embodiments, cahedral 136 is a suction side dihedral 170 and sweep 140 is an aft sweep to facilitate cahedral 136 and sweep 140 working in conjunction. In further embodiments, cahedral 136 is a pressure side anhedral 171 and sweep 140 is a forward sweep to facilitate cahedral 136 and sweep 140 working in conjunction. In alternative embodiments, blade 128 includes any combinations of cahedral 136 and sweep 140 that enable propeller assembly 124 to operate as described herein.

Figure 4:
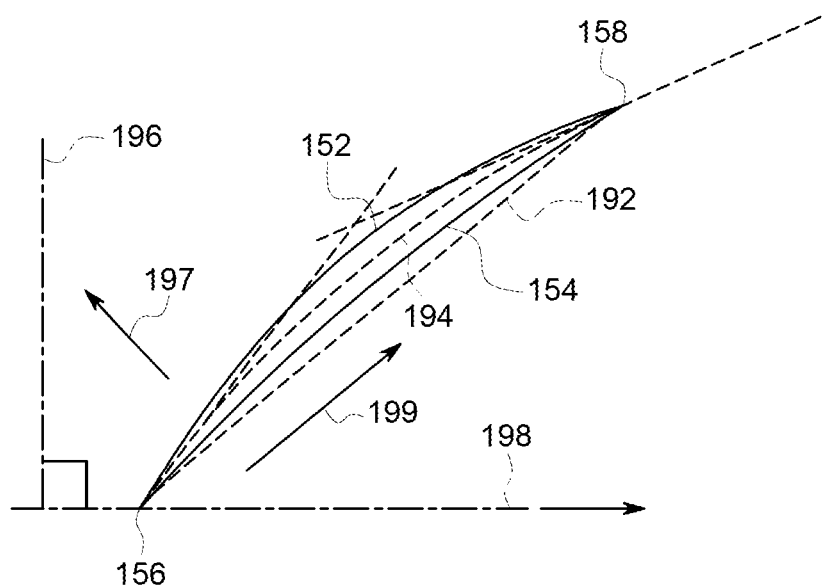
FIG. 4 is a sectional view of the blade shown in FIG. 3.

FIG. 4 is a sectional view of blade 128. Blade 128 further includes a chord line 192, a mean camber line 194, a first axis 196, and a second axis 198. Chord line 192 and mean camber line 194 extend between leading edge 156 and trailing edge 158. Along the span of blade 128, cahedral 136 (shown in FIG. 2A) is defined in a first direction 197 perpendicular to chord line 192 and sweep 140 (shown in FIG. 3) is defined in a direction along chord line 192. In alternative embodiments, blade 128 has any chord line 192 and mean camber line 194 that enable propeller assembly 124 to operate as described herein.

Figure 5:
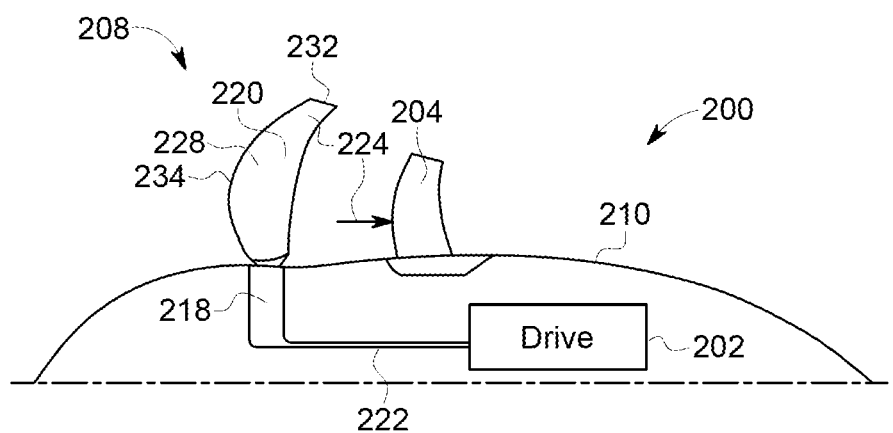
FIG. 5 is a sectional schematic of an alternative rotary machine.

FIG. 5 is a sectional schematic view of an embodiment of a rotary machine in the form of a gas turbine engine, indicated generally by the reference number 200. In the exemplary embodiment of FIG. 5, gas turbine engine 200 is an unducted single fan turbine engine. Unducted single fan turbine engines are described in detail in U.S. Patent Application Publication No. 2015/0284070, which is incorporated by reference herein in its entirety. In the exemplary embodiment, gas turbine engine 200 includes a drive 202 and a propeller assembly 208. A housing 210 at least partially encloses drive 202. Propeller assembly 208 includes a shaft 218 and a plurality of blades 220 coupled to, and extending radially from, shaft 218. Blades 220 extend at least partially exterior of housing 210. A stationary vane 204 is coupled to housing 210 and extends on exterior of housing 210 downstream from blades 220. Drive 202 is drivingly coupled to shaft 218 by a drive shaft 222. During operation, drive 202 transfers rotational power to propeller assembly 208 via shaft 218 and drive shaft 222. Propeller assembly 208 directs air 224 to move in a flow direction. As air 224 is moved by propeller assembly 208, air 224 interacts with blades 220 and stationary vane 204, generating noise. In some embodiments, blades 220 are configured to reduce noise generated. In particular, sweep and cahedral of blades 220 are configured as described in more detail below to cause less propeller self-noise and interaction noise with stationary objects, such as stationary vane 204. In some embodiments, stationary vane 204 includes sweep and cahedral as described herein to further facilitate reduction of generated noise and increase the operating efficiency of gas turbine engine 200. In alternative embodiments, gas turbine engine 200 includes any vanes that enable gas turbine engine 200 to operate as described herein. For example, in some embodiments, stationary vane 204 is disposed upstream of blades 220.

Figure 6:
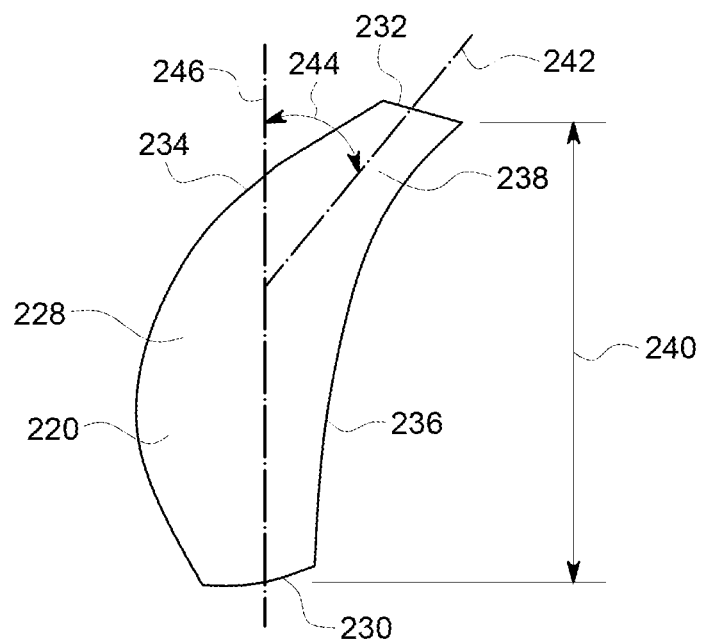
FIG. 6 is a side view of an alternative blade of the rotary machine shown in FIG. 5.

FIG. 6 is a side view of blade 220. Blade 220 includes a high-pressure surface 226 (shown in FIG. 5), a low-pressure surface 228, a proximal end 230, a distal end 232, a leading edge 234, a trailing edge 236, and a distal portion 238. In distal portion 238, low-pressure surface 228 and high-pressure surface 226 define a cahedral. In the exemplary embodiment, low-pressure surface 228 and high-pressure surface 226 define a dihedral. In alternative embodiments, low-pressure surface 228 and high-pressure surface 226 define any cahedral that enables blade 220 to operate as described herein.

In the exemplary embodiment, blade 220 has a length 240 defined between distal end 232 and proximal end 230. Length 240 is any measurement that enables blade 220 to operate as described herein. In the exemplary embodiment, distal portion 238 extends a percentage of length 240 to reduce noise generated in air 116 (shown in FIG. 1) flowing along distal portion 238. In some embodiments, distal portion 238 extends a percentage of length 240 greater than approximately 1%. In the exemplary embodiment, distal portion 238 extends approximately 20% of length 240. In alternative embodiments, distal portion 238 extends any percentage of length 240 that enables blade 220 to operate as described herein.

In the exemplary embodiment, leading edge 234 and trailing edge 236 define a sweep of blade 220. In the exemplary embodiment, sweep is an aft sweep. In alternative embodiments, blade 220 has any sweep that enables propeller assembly 208 to operate as described herein. In the exemplary embodiment, leading edge 234 and trailing edge 236 define sweeps that decreases to the intermediate portion and increase from the intermediate portion to distal end 232. A sweep axis 242 is parallel to both leading edge 234 and trailing edge 236 at distal end 232 and defines a sweep angle 244 with a radial axis 246 of blade 220. In some embodiments, sweep angle 244 is in a range extending from about 1° to about 90°. In further embodiments, sweep angle 244 is in a range extending from about 5° to about 70°. In alternative embodiments, sweep angle 244 is any measurement that enables the blade 220 to operate as described herein.

Figure 7:
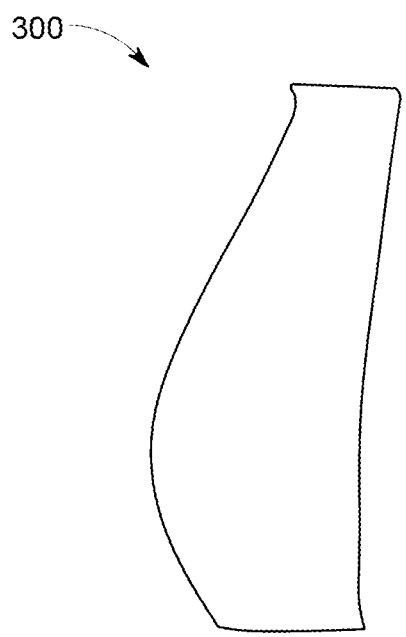
FIG. 7 is a perspective view of an exemplary airfoil.
Figure 8:
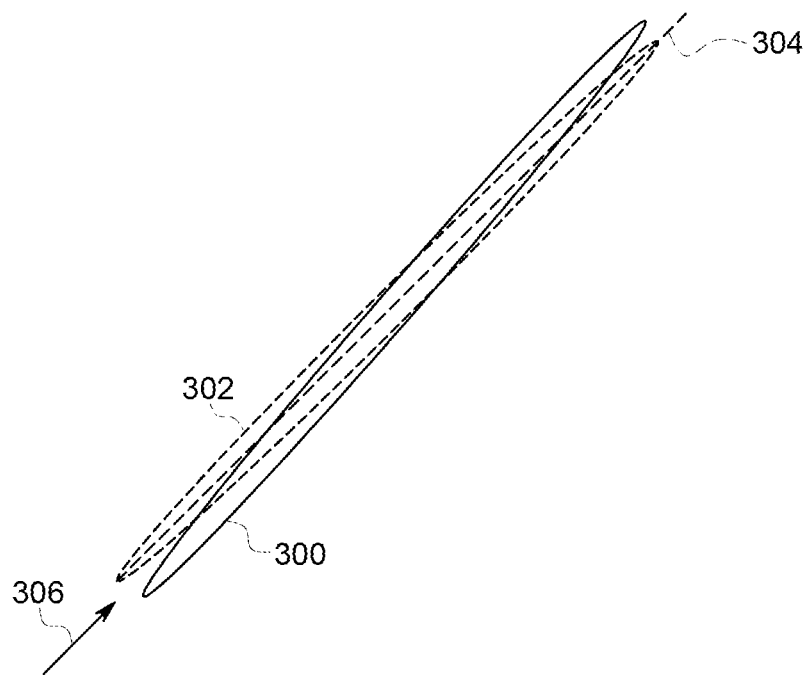
FIG. 8 is a sectional view of the airfoil shown in FIG. 7.

FIG. 7 is a perspective view of an airfoil 300. FIG. 8 is a sectional view of airfoil 300. Airfoil 300 is superimposed on a baseline airfoil 302. In the exemplary embodiment, airfoil 300 is rotated relative to a longitudinal axis 304 of baseline airfoil 302. In some embodiments, airfoil 300 rotated by any angle that enables airfoil 300 to operate as described herein. In the exemplary embodiment, tip loading of airfoil 300 from airflow 306 is reduced at least partly due to the shift of airfoil 300.

Figure 9:
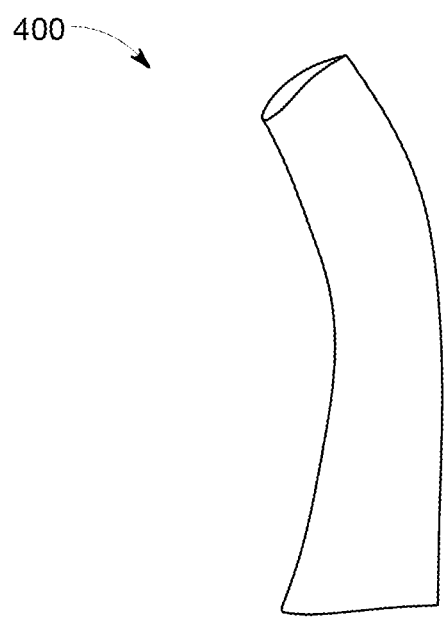
FIG. 9 is a perspective view of another exemplary airfoil.
Figure 10:
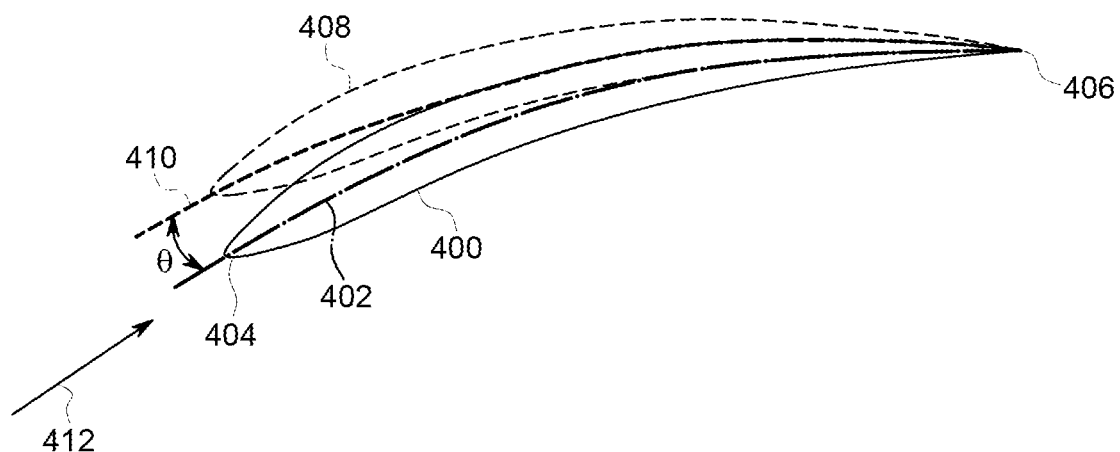
FIG. 10 is a sectional view of the airfoil shown in FIG. 9.

FIG. 9 is a perspective view of an airfoil 400. FIG. 10 is a sectional view of airfoil 400. Airfoil 400 includes a mean camber line 402 extending through a leading edge 404 and a trailing edge 406. Airfoil 400 is superimposed on a baseline airfoil 408, which has a mean camber line 410. Airfoil 400 is shifted in relation to baseline airfoil 408 such that mean camber line 402 and mean camber line 410 make an angle θ. In some embodiments, angle θ is any angle that enables airfoil 400 to operate as described herein. In the exemplary embodiment, acceleration of airflow 412 around leading edge 404 is reduced at least partly due to the shift of airfoil 400, which reduces the drag of airfoil 400 and noise generated by airflow 412. In some embodiments, airfoil 400 includes sweep 140 (shown in FIG. 3) and dihedral 170 (shown in FIG. 2A) to further reduce noise generated during operation of airfoil 400. In further embodiments, a chord line of airfoil 400 is adjusted in relation to a chord line of baseline airfoil 408. For example, in some embodiments, airfoil 400 has a chord length that is greater than the chord length of baseline airfoil 408. In alternative embodiments, airfoil 400 defines any chord that enables airfoil 400 to operate as described herein.

Figure 11:
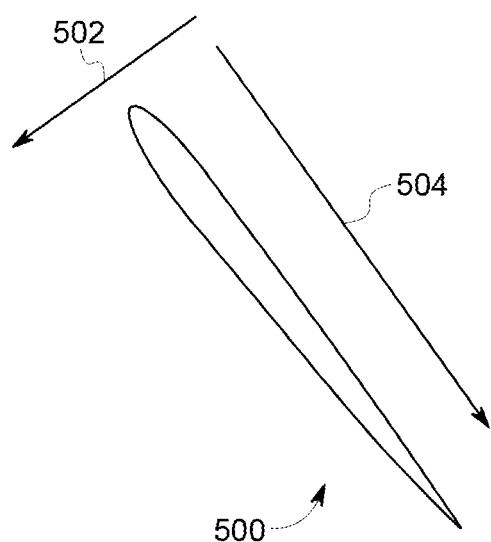
FIG. 11 is a sectional schematic of dihedral and sweep of an exemplary airfoil.

FIG. 11 is a sectional schematic of cahedral and sweep of an airfoil 500. Arrow 502 indicates a direction of cahedral of airfoil 500. In particular, a dihedral (not shown) of airfoil 500 is in the direction of arrow 502. In contrast, an anhedral (not shown) is in the opposite direction of arrow 502. Arrow 504 indicates a direction of sweep of airfoil 500. In particular, an aft sweep (not shown) of airfoil 500 is in the direction of arrow 504. A forward sweep (not shown) is in the opposite direction of arrow 504.

As discussed above, in some embodiments, the distal portion of the blade/airfoil (e.g., blade 128 of FIG. 1) may extend over an acoustically active portion of the airfoil. The acoustically active portion of the blade may be determined, for example, via a relationship between a source strength distributed radially along the airfoil and a radiation efficiency along the airfoil. Such as relationship is shown in FIGS. 12 and 13.

Figure 12:
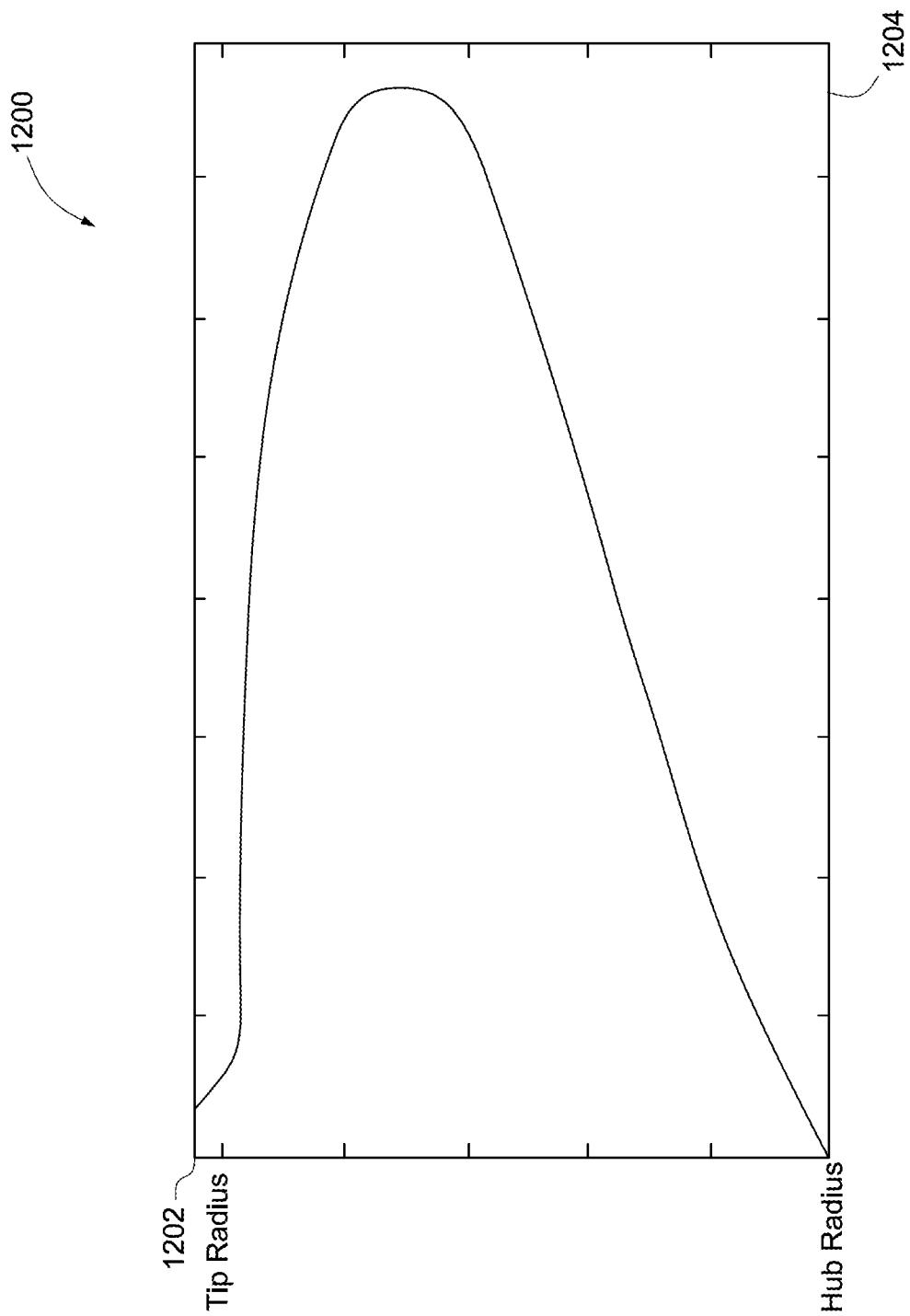
FIG. 12 is a graph depicting a spanwise variation of airfoil (e.g., fan or propeller) aerodynamic loading.
Figure 13:
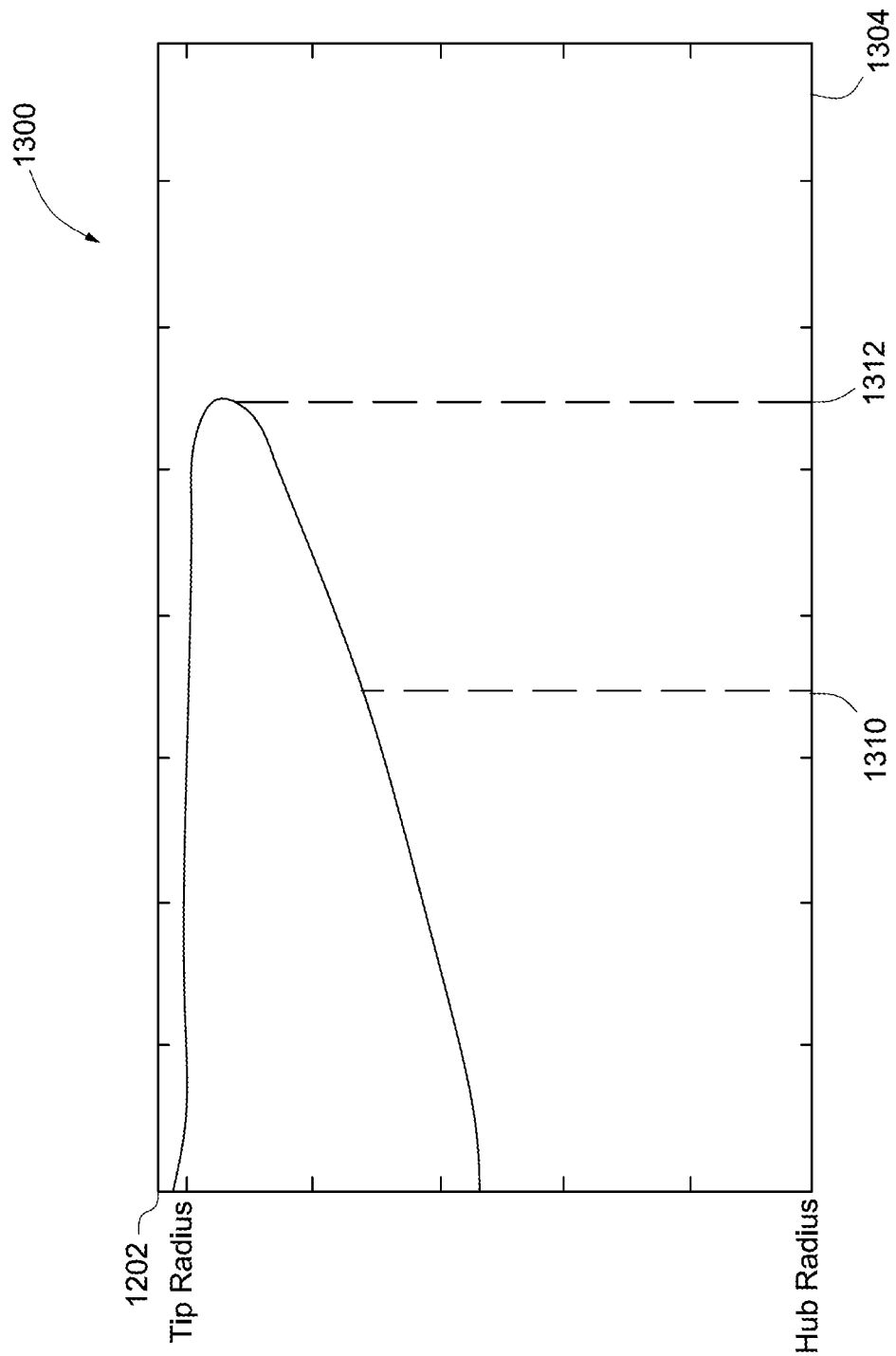
FIG. 13 is a graph depicting for various airfoil (e.g., fan or propeller) locations along the span the effective chordwise integrated acoustic source strength for a rotating noise source.

Referring to FIG. 12, the graph 1200 depicts a spanwise variation of airfoil (e.g., fan or propeller) aerodynamic loading, effectively describing a relevant acoustic source strength. In some embodiments, one or more other parameters may be evaluated, for example blade thickness, unsteady aeroacoustic loading strength, or the like. The graph 1200 depicts values corresponding to an airfoil (e.g., the airfoil described above), wherein the y-axis 1202 is a non-dimensional radius value or radius height (e.g., defined by a radius at a given point along the airfoil from a hub (hub radius) to a radius at the tip of the airfoil (tip radius) and the x-axis 1204 is a loading noise (acoustic) source strength. The source may be any noise source, for example, thickness noise, steady or unsteady load noise, or the like.

The acoustically active portion may be determined by multiplying an acoustic source strength distributed radially along the airfoil (e.g., values shown in FIG. 12) by an acoustic Green's function or radiation efficiency (e.g., the ability of noise sources to propagate acoustic energy to surrounding media) along the airfoil. The radiation efficiency may be any known relation describing the effective strength of a noise source on the airfoil, fan or propeller blade to an observer location of interest, and may be dependent on the airfoil shape, size, flow conditions, combinations thereof, or the like.

The values obtained by multiplying the acoustic source strength by the radiation efficiency may be utilized to then determine a decibel level along the airfoil. Such a decibel level may then be utilized to determine a peak decibel level 1312 (radiation of maximum level from the airfoil) and related acoustically active portion. FIG. 13 shows such a relationship. FIG. 13 is a graph 1300 depicting for various airfoil (e.g., fan or propeller) locations along the span the effective chordwise integrated acoustic source contribution (including farfield radiation effects) for a rotating noise source. The graph 1300 shows the noise contributions for various locations of the airfoil of graph 1200 wherein the y-axis 1202 is a for radius height and the x-axis 1304 is a decibel level along the airfoil.

In some embodiments, the acoustically active portion may be defined by a region of the airfoil starting from the distal end (e.g., distal end 134 described above with respect to FIG. 1) and extending to a location along the airfoil where a noise generated is a predetermined amount less than a peak or maximum noise location. The location of the peak noise generation and location of the weaker noise generating sources may be disposed anywhere along the length of the airfoil. For example, as shown in FIG. 13, the location of the peak noise generation is indicated at 1312 and the location of the weaker noise generating sources is indicated as being inboard of 1310. In this example, the acoustically active portion is defined by a region starting from the distal end of the airfoil (e.g., 134) and extending to the start of the reduced noise generating location indicated at 1310. The predetermined amount may be any reduction in decibels, for example, such as about a 10 dB to about a 20 dB reduction from the peak decibel level. In reference back to FIG. 1, air 116 along blade 128 generates a flow structure 190 adjacent distal portion 138 of blade 128. For comparison, airflow moving along a standard blade operating at a standard tip speed generates a compact flow structure adjacent a tip of the blade. As tip speed is reduced to lower noise, the blade loading increases such that the generated flow structures increase in size and energy, limiting the amount of noise reduction obtainable. For example, highly loaded blades at conditions such as takeoff have a thickened boundary layer and potentially flow separation which may lead to increased noise generation. In contrast, air 116 moving along blade 128 generates a relatively dispersed, low energy flow structure 190 adjacent distal portion 138 of blade 128. Dispersing the flow structure by means of the blade design results in lower radiated noise during periods of aircraft operation such as during takeoff.

In a transonic flow regime, a shock impulse of the flow pattern is decreased in strength by blade 128. In particular, when blade 128 reaches higher Mach numbers at the tip, such as during cruise, the shock impulse propagating from blade 128 has a decreased strength and is smoother (in the nearfield) compared to shock impulses from blades without cahedral 136 and sweep 140. As a result, blade 128 reduces noise generated by systems using blade 128.

In addition, gas turbine engine 100 with blade 128 including sweep 140 (shown in FIG. 3) and dihedral 170 (shown in FIG. 2A) generates less noise than both a rotary machine including a baseline blade and a rotary machine including a blade including only dihedral. When matched with thrust and accounting for the 3-dimensional airfoil design (including twist, camber, chord, and thickness) for corrections to aerodynamic and mechanical loading changes near the tip, gas turbine engine 100 including blade 128 generates less noise than the rotary machine including a baseline blade.

In some embodiments, gas turbine engine 100 includes a ducted and/or shrouded fan and blade 128 reduces the self and interaction noise generated by gas turbine engine 100. For example, in some embodiments, gas turbine engine 100 is any of the following: an aerial vehicle, a turbofan, an air-handling fan, a lift fan, and a pump. Accordingly, during operation of gas turbine engine 100, cahedral 136 and sweep 140 decreases noise generated by interaction between blade 128 and the shroud and/or duct. In addition, blade 128 can increase operability of gas turbine engine 100. Furthermore, cahedral and sweep on stationary vane 204 may provide similar operability and performance enhancements for gas turbine engine 200.

In reference to FIGS. 1-3, an exemplary method of operating a gas turbine engine 100 includes rotating drive shaft 104 to drive rotation of propeller assembly 124. Blade 128 contacts air 116 imparting a force. In some embodiments, distal portion 138 contacts air 116 such that air 116 flows along distal portion 138. A flow pattern is generated in air 116 adjacent the tip. In some embodiments, the flow pattern includes a shock impulse. In the exemplary method, dihedral 170 and sweep 140 of blade 128 are configured such that the shock impulse of the flow pattern is spread smoothly. In some embodiments of the method, air 116 is directed towards inlet 118 of casing 112 after air 116 is contacted by blade 128.

The above-described rotary machine systems decrease the sound generated by the rotary machine systems by including a propeller assembly with blades having a cahedral and a sweep. The cahedral and the sweep reduce noise generated by the rotary machine during rotation of the propeller assembly. In some embodiments, the cahedral and the sweep extend throughout a distal portion of each blade of the propeller assembly to facilitate the rotary machine systems generating less noise during operation than known rotary machine systems. Moreover, the above-described rotary machine systems provide for increased efficiency of the rotary machine systems.

An exemplary technical effect of the embodiments described herein includes at least one of: (a) reducing noise generated by propeller assemblies and fan systems during operation; (b) increasing the operating efficiency of gas turbine engines, and (c) spreading force dispersed from blades to the air.

Exemplary embodiments of blades and propeller assemblies for use in gas turbine engines are described above in detail. The apparatus and systems described herein are not limited to the specific embodiments described, but rather, components of the apparatus and systems may be utilized independently and separately from other components described herein. For example, the blades may also be used in combination with other systems including rotating blades, and are not limited to practice with only the systems described herein. Rather, the exemplary embodiments can be implemented and utilized in connection with many machine system applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An airfoil, comprising:
   a proximal end;
   a distal end opposite said proximal end;
   a distal portion extending adjacent said distal end;
   an edge extending between said proximal end and said distal end; and
   a surface extending between said proximal end and said distal end, said edge and said surface defining a sweep and a cahedral through said distal portion, wherein the distal portion extends over an acoustically active portion of the airfoil, wherein the distal portion is configured to reduce the noise resulting from the acoustically active portion of the airfoil.

2. The airfoil in accordance with claim 1, wherein the acoustically active portion of the airfoil is determined by multiplying an acoustic source strength distributed radially along the airfoil by a radiation efficiency along the airfoil.

3. The airfoil in accordance with claim 1, wherein the acoustically active portion is defined by a region of the airfoil extending from the distal end to a location along the airfoil that generates about 10 to about 20 dB less noise than a location along the airfoil which generates a maximum level of noise.

4. The airfoil in accordance with claim 1, wherein said edge is at least one of a trailing edge and a leading edge.

5. The airfoil in accordance with claim 4, wherein a camber of said airfoil is adjusted in span and chord directions of said airfoil to reduce adverse effects of a high flow acceleration around said at least one of a trailing edge and a leading edge.

6. The airfoil in accordance with claim 4, wherein a twist of said airfoil is adjusted along a span of said airfoil to compensate for the aerodynamic loading due to the cahedral and the sweep.

7. The airfoil in accordance with claim 1, wherein the cahedral is a dihedral or anhedral.

8. The airfoil in accordance with claim 7, wherein said edge and said surface define an anhedral in addition to the dihedral.

9. The airfoil in accordance with claim 7, wherein the sweep is a forward sweep or aft sweep.

10. The airfoil in accordance with claim 1, wherein at least one of the cahedral or sweep is varied throughout at least a portion of the airfoil.

11. The airfoil in accordance with claim 1, wherein said surface comprises a high-pressure surface, said airfoil further comprising a low-pressure surface opposite said high-pressure surface, said high-pressure surface and said low-pressure surface sloped throughout said distal portion to at least partly define the cahedral.

12. The airfoil in accordance with claim 11, further comprising a shift, each of said high-pressure surface and said low-pressure surface having a curved shape adjacent said shift.

13. The airfoil in accordance with claim 1, wherein said airfoil comprises at least one of the following: single rotation propeller, an outlet guide vane, a fan blade, a rotor blade, a stator vane, a ducted fan blade, an unducted fan blade, a strut, a wind turbine blade, a propeller, an impeller, a diffuser vane, a return channel vane, a marine propeller, and a pylon.

14. A rotary machine, comprising:
at least one rotatable member;
a casing extending at least partly circumferentially around said at least one rotatable element; and
a propeller assembly adjacent said casing and drivingly coupled to said at least one rotatable member, said propeller assembly comprising:
a hub;
at least one blade extending radially from said hub, said at least one blade comprising:
a proximal end adjacent said hub;
a distal end opposite said proximal end;
an intermediate portion extending between said proximal end and said distal end;
a distal portion extending between said intermediate portion and said distal end;
an edge extending between said proximal end and said distal end; and
a surface extending between said proximal end and said distal end, said edge and said surface defining a sweep and a cahedral through said distal portion and at least a portion of said intermediate portion, wherein the distal portion extends over an acoustically active portion of the blade, wherein the distal portion is configured to reduce the noise resulting from the acoustically active portion of the airfoil.

15. The rotary machine in accordance with claim 14, wherein the acoustically active portion of the blade is a region of the blade determined by multiplying an acoustic source strength distributed radially along the blade by a radiation efficiency along the blade.

16. The rotary machine in accordance with claim 14, wherein the acoustically active portion is defined by a region of the blade extending from the distal end to a location along the blade that generates about 10 to about 20 dB less noise than a location along the blade that generates a maximum level of noise.

17. The rotary machine in accordance with claim 14, wherein said at least one blade defines a low pressure side and a high pressure side, said surface extending on the low pressure side of said at least one blade such that the cahedral is a dihedral.

18. The rotary machine in accordance with claim 14, wherein the cahedral is a dihedral.

19. The rotary machine in accordance with claim 18, wherein the dihedral extends on a suction side of said at least one blade and the sweep is an aft sweep.

20. The rotary machine in accordance with claim 14, wherein at least one of the cahedral or sweep is varied throughout at least a portion of the blade.

* * * * *